March 19, 1963
B. B. BROWN
3,081,577
FISHING TACKLE
Filed Sept. 2, 1958
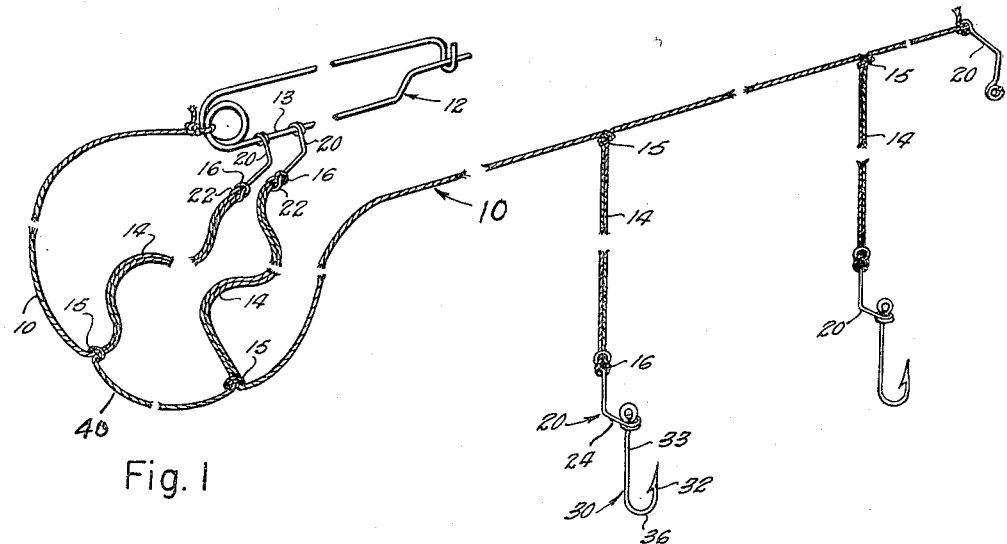
Fig. 1
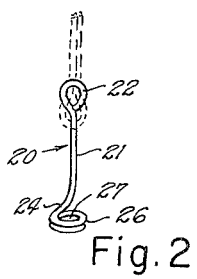
Fig. 2
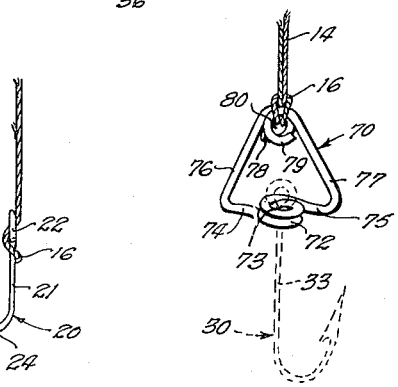
Fig. 3
Fig. 7
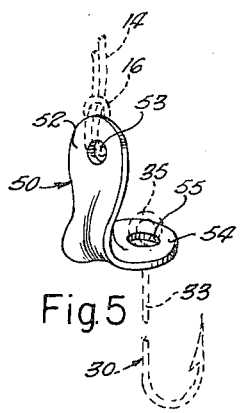
Fig. 5
Fig. 4
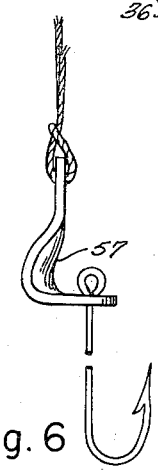
Fig. 6
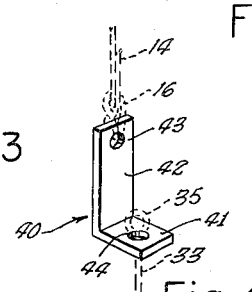
INVENTOR
Bently B. Brown
BY *H. Hastings Ashley*
ATTORNEY

United States Patent Office 3,081,577
Patented Mar. 19, 1963

3,081,577
FISHING TACKLE
Bently B. Brown, Box 54, Diana, Tex.
Filed Sept. 2, 1958, Ser. No. 758,260
2 Claims. (Cl. 43—54.5)

This invention relates to fishing tackle and more particularly to trot lines and to fish hook holding devices for use with trot lines or the like.

An object of this invention is to provide a new and improved trot line which is provided with hooks at spaced intervals.

Still another object of the invention is to provide a single piece trot line having a plurality of loops tied off at spaced intervals, the lower ends of the loops being provided with fish hook holders.

Still another object of the invention is to provide a trot line wherein the fish hook holders are detachably secured to the loops.

A further object is to provide a trot line wherein the fish hook holders permit limited vertical movement of the fish hooks supported thereby.

A still further object of the invention is to provide a trot line wherein the fish hooks are rotatable about a vertical axis and movable vertically and longitudinally relative to the fish hook holders whereby the live bait secured to the fish hooks may move quite freely in a natural manner to attract fish.

Still another object of the invention is to provide a fish hook holder having an upper end provided with a means whereby it may be secured to a loop of a trot line, fishing line or the like and having a socket laterally offset from the shank for receiving the shank of a fish hook, the eye of the fish hook engaging the socket to limit downward movement of the fish hook therein whereby the fish hook may move vertically relative to the holder.

Still another object is to provide a fish hook holder having an arm provided with an eye at its upper end for receiving a loop of a trot line, fishing line, leader or the like whereby the holder may be secured to the trot line or a fishing line and an arm angularly extending from the opposite end of the shank and provided with an aperture at its free end for receiving the shank of a fishing hook, the aperture being of smaller dimensions than the eye of the hook but greater than that of the barb of the hook whereby the fish hook may be removably mounted on the holder for limited vertical movement relative thereto.

A still further object of the invention is to provide a fish hook holder which is formed of a single piece of wire and which has a vertical shank provided with a loop or eye at its upper end and a substantially horizontal arm extending angularly from the shank and provided with a loop at its free end for receiving the shank of a fishing hook and engaging the eye at the upper end of the fishing hook shank.

Another object of the invention is to provide a fish hook holder comprising a socket formed from a plurality of loops of wire intermediate the ends thereof for receiving the shank of a hook, the free ends of the wire extending first laterally outwardly in opposite directions from the loop and then upwardly convergently and having their upper ends bent to form loops whereby a leader, fish line or trot line may extend through the loops to secure the holder thereto.

A further object of the invention is to provide a single piece fish hook holder having a substantially upright arm provided with an aperture at its upper end by means of which the fish hook holder may be secured to a fishing line, trot line, leader or the like and a substantially horizontal arm extending angularly from the upright arm and provided with an aperture for receiving the shank of a fishing hook, the aperture being of such dimensions as to prevent the passage of the hook of the eye of the fishing hook therethrough.

Additional objects and advantages of the invention will be readily apparent from the reading of the following description of a device constructed in accordance with the invention, and reference to the accompanying drawings thereof, wherein:

FIGURE 1 is a perspective view of a portion of a trot line provided with spaced loops and with fish hook holders removably attached to the lower ends of the loops for movably holding fish hooks in accordance with the invention;

FIGURE 2 is a front view of one of the fish hook holders of the front line shown in FIGURE 1;

FIGURE 3 is a side view of the fish hook holder illustrated in FIGURES 1 and 2 showing the manner in which the fish hook is movably held thereby;

FIGURE 4 is a perspective view of another form of fish hook holder;

FIGURE 5 is a perspective view of still another form of the fish hook holder;

FIGURE 6 is a side view of the fish hook holder illustrated in FIGURE 5 shown holding a fish hook; and FIGURE 7 is a front view of still another form of fish hook holder.

Referring now particularly to FIGURES 1, 2 and 3 of the drawings, the single piece trot line 10 is provided at one end with a pin or clasp 12 by means of which it may be secured to a stationary object on the shore, a boat or the like. The trot line is provided with a plurality of loops 14 which are tied off from the substantially horizontal trot line by suitable knots 15. The lower ends 16 of the loops have removably secured thereto the fish hook holders 20.

The fish hook holders 20 each comprise a substantially vertical shank 21 which is bent at its upper end to form a closed eye 22. A substantially horizontal arm 24 extends from the lower end of the shank 21 and is provided at its outer end with a double loop which forms a socket 26. It will be noted that the longitudinal axis of the aperture 27 of the socket 26 is spaced laterally from the shank 21 and the eye 22 thereof.

The fish hook holder 20 may be removably secured to the end 16 of a loop 14 of the trot line by passing the end 16 of the loop through the socket 22 and then rotating the fish hook holder in such manner as to cause it to pass through the loop end which extends past the eye 22. In this manner, the fish hook holder may be removably but securely attached to the loops 14.

The fish hook 30 is then attached or mounted on the fish hook holders 20 by passing the barbed hook 32 thereof downwardly through the aperture 27 of the socket 26, the shank 33 of the hook then passing downwardly through the aperture 27 until the eye 35 at the upper end of the shank 33 of the fish hook rests on or is received by the socket 26. The fish hook is then free to rotate in the socket about the axis of its shank and, at the same time, is also free to move vertically, the shank being slidably received in the socket 26.

Downward movement of the hook is limited by the engagement of the eye 35 of the shank with the socket 26 while upward movement of the hook is limited by the engagement of the bight portion 36 of the hook with the socket 26. If live bait is now secured to the hook 30, the bait, such as a minnow, may swim about both in horizontal and vertical planes since the hook is movably held by the fish hook holder 20. Such lifelike movement of the bait will, of course, attract the desired fish to the bait.

In use, the trot line may have one end secured to an anchor disposed in a body of water or to an object on the shore. As the trot line is paid out, loops 14 may be formed therein at spaced intervals by forming the loops 14 and then tying a suitable knot 15 at their upper ends. Fish hook holders 20 are then secured to the lower end 16 of each loop 14 and next the hooks 30 are removably mounted on the fish hook holders 20. The hooks are, of course, baited before they are lowered into the water. In this manner, the trot line is set out in the body of water which is to be fished.

The live bait, of course, is then free to move since the hooks are free to rotate about the vertical axes of the shanks 33 and since the hooks are also free to move vertically with respect to the fish hook holders. The trot line, of course, is brought up periodically to remove the catch from the hooks 32 and to rebait such hooks.

When it is desired to take up the trot line, the operator pulls in one end of the trot line and when the first loop 14 is reached, he removes the fish hook 30 from the fish hook holder by moving the shank 33 thereof upwardly through the aperture 27 of the socket 26 of the fish hook holder, rotating the fish hook as the bight 36 and hook 32 pass through the aperture 27. In this manner, the trot line may be wound or reeled on a drum or other object without fear of entanglement of the fish hooks with the said trot line. If desired, the fish hook holders themselves could be easily removed or detached from the lower end 16 of the loops 14 by sliding the eyes 22 of the fish hook holder upwardly on the loops 14 then rotating the shank 21 and socket 26 through the lower ends of the loops in a reversal of the procedure by which such fish hook holders were secured to the loops 14. If desired, trot line may also be secured for storage or transportation on the clasp 12 by passing the free end of the shank 13 through the aperture 27 of each fish hook holder. The trot line then depends in loops 40 from the clasp. The end of the trot line not secured to the clasp may also be provided with a holder 20 so that the free end also may be secured to the shank 13 by passing the shank 13 through its aperture 27.

Obviously the trot line, when it is to be used again after storage on the clasp, may be payed out gradually, each holder sliding off its shank 13 to allow its loop 14 to fall free. As the loops 14 are already tied off, all that remains to place the trot line in operative condition is the attachment of the hooks 30 to the holders.

It will now be seen that a new and improved trot line has been illustrated which is easily set out and taken up since the fish hooks are attached to the trot line as the trot line is set out and are detached from the trot line as the trot line is taken up.

It will further be seen that the trot line is formed of a single continuous line having a plurality of loops which are tied off from the line and which have removably secured to their lower ends fish hook holders 20.

It will further be seen that the fish hook holders 20 have upright shanks or arms provided with apertures at their upper ends through which the free lower ends of the loops 14 may be passed in order to removably secure the fish hook holders to the loops.

It will further be seen that the fish hook holders 20 are provided with sockets 26 which are offset laterally or horizontally from the shanks 21 whereby the shanks 33 of the fish hooks are removably held by the fish hook holders and may move vertically relative to the fish hook holders without being obstructed in such movement by or engaging the shanks 21 or the lower ends 16 of the loops 14 which are attached to such shanks.

It will further be seen that the fish hook holders are provided with sockets 26 which are engaged by the eyes 35 of the fish hooks to limit downward movement of the fish hooks relative to the fish hook holders.

It will further be seen that the fish hooks are removably secured to the fish hook holders whereby the fish hooks may be detached from the fish hook holders when it is desired to store or transport the trot line.

It will further be seen that the fish hook holders may, of course, be secured to the lower end of a leader or a fishing line for use therewith as well as with a trot line.

In FIGURE 4 is illustrated a fish hook holder 40 which is formed of a single piece of metal having a vertical shank portion 42 provided at its upper end with an aperture 43 through which the lower end 16 of the loops 14 of the trot line may be passed to secure the fish hook holder removably to such loops. The fish hook holder 40 is also provided with an angularly extending arm 41 at the lower end of the shank portion 42 which is provided with an aperture 44 for receiving the shank 33 of a fish hook, the eye 35 of the fish hook engaging the arm 41 to limit downward movement of the fish hook relative to the fish hook holder. It will be apparent that the fish hook holder 40 may be used in exactly the same manner as the fish hook holders 20.

In FIGURES 5 and 6 is illustrated still another form of the fish hook holder. The fish hook holder 50 is formed of a single piece having an upright shank 52 provided with an aperture 53 through which the lower end of the loop 14 may be passed to detachably secure the fish hook holder to the loop. The fish hook holder 50 also has an arm 54 which extends angularly from the lower end of the shank 52 and is provided with an aperture 55 through which the shank 33 of the hook 30 is passed, the eye 35 thereof being engaged by the arm 54 to limit downward movement of the hook. The fish hook holder 50 may be formed with a curved rib 57 intermediate its side edges and between the shank 52 and arm 54 which serves to help rigidify and strengthen the fish hook holder. The fish hook holder 50, of course, is used in exactly the same manner as the fish hook holders 20 described above.

In FIGURE 7 is illustrated still another form of fish hook holder. The fish hook holder 70 is formed of a single piece of wire which is bent intermediate its ends to form two loops of wire forming a socket 72 having a vertical aperture 73 through which the shank 33 of a hook 30 may pass. The portions 74 and 75 of the wire extend in opposite directions from the socket 72 and are provided at their outer ends with sections 76 and 77 which extend convergently upwardly and are provided at their upper ends with eyes or loops 78 and 79 whose apertures are aligned so that the ends 16 of the loops 14 may pass through such aligned apertures.

It will now be seen that each of the fish hook holders illustrated and described is provided with a horizontal aperture at an upper end portion through which the lower ends 16 of the loops 14 may pass to secure the fish hook holder detachably thereto and with a vertical aperture which is disposed below and laterally spaced from the upper horizontal aperture whereby the fish hooks may be removably passed through such vertical aperture without hindrance by the lower ends 16 of the loops 14 or by the upper portions of the fish hook holders which provide such upper apertures.

It will further be seen that the fish hook holders and the fish hooks are removably attached to the trot line, fishing line or the like whereby the fish hooks may be removed from the fish hook holders and the fish hook holders may be removed from the line whenever it is so desired.

It will further be seen that the provisions of the fish hook holder which allows movement of the hook in a vertical plane as well as rotational movement of the fish hook about a vertical axis permits live bait to move about freely in a natural movement whereby the game fish which is sought to catch are attracted by such movement.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A trotline comprising: a single piece line having a longitudinal line portion, a plurality of loops spaced along said line portion and integral therewith and knots in said line at the upper ends of said loops defining upper ends of said loops, said loops having free lower ends; fish hook holders attached to the lower free ends of said loops, said fish hook holders having sockets provided with vertical apertures laterally spaced from the lower free ends of said loops; fish hooks having shanks provided with eyes at their upper ends, the shanks of the hooks being extendable through said apertures, the eyes of the hooks engaging the sockets to limit downward movement of the fish hooks relative to the sockets, the shanks of the hooks being freely longitudinally and rotatably movable relative to the sockets; and a clasp having a shank, said clasp being secured to one end of said line, said shank of said clasp being movable through said apertures of said sockets of said fish hook holders when said clasp is open, said shank of said clasp being substantially straight whereby the fish hook holders may slide off said shank of said clasp, said free ends of said loops being attachable to said shank of said clasp by means of said apertures of said sockets of said fish hook holders.

2. The trotline of claim 1 wherein said line has a fish hook holder secured to its other end.

References Cited in the file of this patent

UNITED STATES PATENTS

| | | |
|---|---|---|
| 1,895,301 | Vandermark | Jan. 24, 1933 |
| 1,905,449 | Dunn | Apr. 25, 1933 |
| 2,138,702 | Litsey | Nov. 29, 1938 |
| 2,437,549 | Pecher | Mar. 9, 1948 |
| 2,555,397 | Coward | June 5, 1951 |
| 2,775,842 | McCode | Jan. 1, 1957 |
| 2,871,540 | Smith | Feb. 3, 1959 |
| 2,929,165 | Rees | Mar. 22, 1960 |